(12) United States Patent
Ichihara (10) Patent No.: US 10,683,086 B2
(45) Date of Patent: Jun. 16, 2020

(54) UNMANNED ROTORCRAFT AND METHOD FOR MEASURING CIRCUMJACENT OBJECT AROUND ROTORCRAFT

(71) Applicant: PRODRONE CO., LTD., Nagoya-shi, Aichi (JP)

(72) Inventor: Kazuo Ichihara, Nagoya (JP)

(73) Assignee: PRODRONE CO., LTD., Nagoya-shi (JP)

( * ) Notice: Subject to any disclaimer, the term of this patent is extended or adjusted under 35 U.S.C. 154(b) by 0 days.

(21) Appl. No.: 15/558,058

(22) PCT Filed: Mar. 22, 2016

(86) PCT No.: PCT/JP2016/058970
§ 371 (c)(1),
(2) Date: Sep. 13, 2017

(87) PCT Pub. No.: WO2016/148303
PCT Pub. Date: Sep. 22, 2016

(65) Prior Publication Data
US 2018/0065735 A1    Mar. 8, 2018

(30) Foreign Application Priority Data
Mar. 19, 2015 (JP) ................... 2015-056957

(51) Int. Cl.
*G06F 19/00* (2018.01)
*B64C 27/08* (2006.01)
(Continued)

(52) U.S. Cl.
CPC .............. *B64C 27/08* (2013.01); *B64C 25/32* (2013.01); *B64C 39/024* (2013.01); *B64D 45/04* (2013.01);
(Continued)

(58) Field of Classification Search
CPC ....... B64C 27/08; B64C 39/02; B64C 39/024; B64C 2025/325; B64C 2201/027; *B64D 47/08* (2013.01); *B64C 2025/325* (2013.01); *B64C 2201/027* (2013.01); *B64C 2201/108* (2013.01); *B64C 2201/14* (2013.01); *B64D 45/08* (2013.01)

(56) References Cited

U.S. PATENT DOCUMENTS

2009/0251359 A1   10/2009   Becker et al.
2011/0101156 A1    5/2011   Choi
(Continued)

FOREIGN PATENT DOCUMENTS

JP     2002-225800 A    8/2002
JP     2004-156944 A    6/2004
(Continued)

OTHER PUBLICATIONS

Jun. 21, 2016 International Search Report issued in International Patent Application No. PCT/JP2016/058970.

*Primary Examiner* — Ronnie M Mancho
(74) *Attorney, Agent, or Firm* — Oliff PLC (57) ABSTRACT

To provide an unmanned rotorcraft and a method for measuring a distance to a circumjacent objet around the rotorcraft, enabling it to prevent its airframe from colliding with a circumjacent object when flying and prevent its airframe from falling down when landing, while suppressing an increase in airframe cost. This is solved by an unmanned rotorcraft including a distance sensor to measure a distance between its airframe and a circumjacent object around it, the distance sensor and its detection direction being fixed to the airframe, and a method for measuring a distance to a circumjacent objet around the rotorcraft, adapted to watch or watch out for a circumjacent object around the airframe by turning the airframe automatically in a yaw direction under predefined conditions or to measure a difference of elevation at landing points of all legs of the airframe.

10 Claims, 9 Drawing Sheets

(51) Int. Cl.
  *B64D 45/04* (2006.01)
  *B64C 25/32* (2006.01)
  *B64D 47/08* (2006.01)
  *B64C 39/02* (2006.01)
  *B64D 45/08* (2006.01)

(58) Field of Classification Search
  CPC .......... B64C 2201/108; B64C 2201/14; B64D 45/04; B64D 47/08; B64D 45/08
  USPC .................................................. 700/245, 247
  See application file for complete search history.

(56) References Cited

U.S. PATENT DOCUMENTS

| 2011/0137498 | A1 |   | 6/2011  | Suzuki |             |
|--------------|----|---|---------|--------|-------------|
| 2014/0200863 | A1 | * | 7/2014  | Kamat  | G01C 15/00  |
|              |    |   |         |        | 703/1       |
| 2015/0160658 | A1 | * | 6/2015  | Reedman| G05D 1/102  |
|              |    |   |         |        | 701/3       |
| 2015/0379876 | A1 | * | 12/2015 | Navot  | G08G 5/0021 |
|              |    |   |         |        | 701/301     |
| 2016/0320165 | A1 | * | 11/2016 | Rovinsky | F42B 12/22 |
| 2017/0210486 | A1 | * | 7/2017  | O'Brien | B64C 1/062 |

FOREIGN PATENT DOCUMENTS

| JP | 2009-282014 A   |   | 12/2009 |            |
|----|-----------------|---|---------|------------|
| JP | WO2010137596    | * | 2/2010  | B64C 13/18 |
| JP | 2010-132096 A   |   | 6/2010  |            |
| JP | 2011-527264 A   |   | 10/2011 |            |
| JP | 2012-81936 A    |   | 4/2012  |            |
| JP | 2014-119828 A   |   | 6/2014  |            |
| JP | 2014-149622 A   |   | 8/2014  |            |
| JP | 2015-24705 A    |   | 2/2015  |            |
| JP | 5688700 B2      | * | 3/2015  | B64C 39/024|
| JP | 5688700 B2      |   | 3/2015  |            |
| WO | 2010/137596 A1  |   | 12/2010 |            |

\* cited by examiner

UNMANNED ROTORCRAFT AND METHOD FOR MEASURING CIRCUMJACENT OBJECT AROUND ROTORCRAFT

TECHNICAL FIELD

The present invention relates to an unmanned rotorcraft and a method for measuring a distance to a circumjacent object around the rotorcraft.

BACKGROUND ART

Conventionally, miniature unmanned aircraft which are typified by unmanned helicopters for industrial use have been expensive and hard to procure and manipulative skills have been needed to make them fly stably. However because a great advance has lately been made in improvement of a suite of sensors and software which are used for attitude control and autonomous flying, maneuverability of unmanned aircraft has improved significantly and, in addition, high-performance airframes of such aircraft have become, available at moderate price. Because of background circumstances as above, attempts are now to made to apply, especially, miniature multicopters to diverse missions in a wide range of fields, not only for hobby purposes.

CITATION LIST

Patent Literature

PTL1: Japanese Patent No. 5688700
PTL2: JP 2014-149622 A
PTL3: JP 2015-024705 A

SUMMARY OF INVENTION

Technical Problem

As high-performance multicopters have become available easily, multicopters are becoming popular, spreading to even users who do not have adequate maneuvering skills and knowledge. Although basic control of an airframe is automated, if a user manipulates recklessly, it could directly lead to a collision accident or a fall accident. To prevent such an accident, various mechanisms for safety are considered, but a hardware-based approach to realize this involves a problem in which it is hard to suppress an increase in airframe cost because of an increase in the number of sensors, employing sensors with higher performance, equipping the airframe, with a unique safety mechanism, and the like.

PTL1 mentioned above discloses a multicopter that flies autonomously, detecting a circumjacent object using an ultrasonic sensor and an infrared sensor. The multicopter of PTL1 is equipped with a unique mechanism that changes the orientation of the infrared sensor with a servo motor. This mechanism serves to detect the edge of a landing site and allows the multicopter to land on a safe site. For a multicopter disclosed in PTL3 mentioned above, a 2D laser scanning system in which angle sampling steps are 0.25°, a range of angles of detection is 360°, and a sensor detection range is 30 m is mounted in its airframe. This system serves to detect a distance between the airframe and a circumjacent obstacle. Such a laser scanning system is markedly expensive, as compared with commonly used distance sensors which are mounted in a multicopter. Furthermore, PTL2 mentioned above discloses a miniature electric-powered helicopter that measures a height above ground when landing through an ultrasonic sensor and a Kalman filter. However, in PTL2, no supposition is made about a case where ground at a landing point is rough.

In consideration of the foregoing problem, a problem to be solved by the present invention is to provide an unmanned rotorcraft and a method for measuring a distance to a circumjacent objet around the rotorcraft, enabling it to prevent its airframe from colliding with a circumjacent object when flying and prevent its airframe from falling down when landing, while suppressing an increase in airframe cost.

Solution to Problem

To solve the foregoing problem, an unmanned rotorcraft of the present invention is characterized in that it includes a distance sensor to measure a distance between its airframe and a circumjacent object around it, the distance sensor and its detection direction are fixed to the airframe, and the unmanned rotorcraft further includes automatic turning means for turning the airframe automatically in a yaw direction under predefined conditions to orient the distance sensor toward a plurality of different orientations or positions.

Using a commonly used distance sensor with its detection direction fixed relatively with respect to the orientation of the airframe, by turning the airframe itself to measure a distance in a plurality of different orientations and positions, it is enabled to detect a positional relation between the airframe and a circumjacent object around it in a wider range, while suppressing increase in airframe cost.

In addition, the automatic turning means may be configured to turn the airframe in predetermined angle steps according to a detection angle of the distance sensor.

In addition, the automatic turning means may be configured to turn the airframe continuously.

Selecting an optimal turning operation according to the principle and performance of the distance sensor makes it possible to measure a distance to a circumjacent object more accurately.

In addition, the automatic turning means may be configured to turn the airframe so as to orient the distance sensor along a direction of movement of the airframe and, additionally, orient the distance sensor toward a direction differing from the direction of movement of the airframe at a predetermined period and by a predetermined angle, when the airframe is flying horizontally.

By making an arrangement such that, when the airframe is flying horizontally, distance-to-object measurement with a central focus on the direction of its movement is also performed in other directions periodically, it is enabled to watch mainly along the direction of movement with the highest risk of collision with a circumjacent object and, at the same time, also watch out for an approaching object from other directions.

In addition, the unmanned rotorcraft may be configured further including circumjacent object storing means for, when the distance sensor has detected a circumjacent object, storing position of the circumjacent object as a circumjacent object to watch out for, and collision predicting means for calculating a predicted time of collision with the circumjacent object based on the flying speed of the airframe and the position of the circumjacent object when the detected circumjacent object is not stored as the circumjacent object to watch out for, and calculating a predicted time of collision with the circumjacent object based on a relative approach speed between the airframe and the circumjacent object and the position of the circumjacent object when the detected circumjacent object is stored as the circumjacent object to watch out for.

By including the circumjacent object storing means for storing the position of a detected circumjacent object, it is enabled to calculate a relative approaching speed from the position information on detecting the circumjacent object again. In addition, when a circumjacent object has been detected for the first time, by calculating a predicted time of collision based on the position (detection direction and distance) of the circumjacent object and the flying speed of the airframe, it can be designed to fulfill both an accurate risk decision based on a relative speed with the circumjacent object and ensuring safety against an imminent risk with uncertainty.

In addition, the unmanned rotorcraft may be configured further including a plurality of legs to support the airframe when the airframe lands. The distance sensor is installed in a position and orientation in a portion of the plurality of legs, making it possible to measure a distance between at least one of the legs and its landing point, and the automatic turning means turns the airframe near a landing point and measures a distance to the landing point for all the legs.

By measuring the distances of the respective legs to their landing points by turning the airframe, it is possible to detect roughness of ground at the airframe landing point beforehand and prevent the airframe from falling down when landing.

In addition, it is preferable to further include landing point changing means for displacing the airframe in a horizontal direction when a difference in the distances from the respective legs to their landing points measured by the automatic turning means is more than a predetermined value.

In a case where a difference of elevation more than tolerance has been detected for a landing point of any leg, it is possible to land the airframe, selecting a place having a smaller difference of elevation, by displacing the airframe landing position in a horizontal direction. This makes it possible to prevent the airframe from falling down when landing with sureness.

To solve the foregoing problem, a method for measuring a distance to a circumjacent object around an unmanned rotorcraft is characterized in that the unmanned rotorcraft includes a distance sensor to measure a distance between its airframe and a circumjacent object around it, the distance sensor and its detection direction are fired to the airframe, and the method includes a procedure for watching for an approaching object to detect a circumjacent object all around the airframe by automatically turning the airframe, around entirely in its yaw direction under predefined conditions.

Using a commonly used distance sensor with its detection direction fixed relatively with respect to the orientation of the airframe, by turning the airframe itself around entirely in its yaw direction, it is possible to find a circumjacent object as an object to watch out for all around the airframe, while suppressing an increase in airframe cost.

To solve the foregoing problem, a method for measuring a distance to a circumjacent object around an unmanned rotorcraft is characterized in that the unmanned rotorcraft includes a distance sensor to measure a distance between its airframe and a circumjacent object around it, the distance sensor and its detection direction are fixed to the airframe, and the method includes a procedure for watching for an obstacle to turn the airframe so as to orient the distance sensor along a direction of movement of the airframe and, additionally, orient the distance sensor toward a direction differing from the direction of movement of the airframe at a predetermined period and by a predetermined angle when the airframe is flying horizontally.

By making an arrangement such that, when the airframe is flying horizontally, distance-to-object measurement with a central focus on the direction of its movement is also performed in other directions periodically, it is enabled to watch mainly along the direction of movement with the highest risk of collision with a circumjacent object and, at the same time, also watch out for an approaching object from other directions.

To solve the foregoing problem, a method for measuring a distance to a circumjacent object around an unmanned rotorcraft is characterized in that the unmanned rotorcraft includes a distance sensor to measure a distance between its airframe and a circumjacent object around it, and a plurality of legs to support the airframe when the airframe lands, the distance sensor is installed in a position and orientation in a portion of the plurality of legs, making it possible to measure a distance between at least one of the legs and its landing point, and the method includes a procedure for detecting a difference of elevation to measure a distance to a landing point for all the legs by turning the airframe near a landing point.

By measuring the distances of the respective legs to their landing points by turning the airframe, it is possible to detect roughness of ground at the airframe landing point beforehand and prevent the airframe from falling down when landing.

Advantageous Effects of Invention

As described above, according to an unmanned rotorcraft and a method for measuring a distance to a circumjacent object around the rotorcraft it is enabled to prevent its airframe from colliding with a circumjacent object when flying and prevent its airframe from falling down when landing, while suppressing an increase in airframe cost.

DESCRIPTION OF EMBODIMENTS

In the following, an embodiment of the present invention will be described in detail with the aid of the drawings. An unmanned rotorcraft and a method for measuring a distance to a circumjacent object around the rotorcraft pertaining to an embodiment which will be described hereinafter are illustrated by an example of a multicopter equipped with four rotors. Now, a multicopter in an embodiment disclosed herein is just required to be an unmanned aircraft equipped with rotors, which can be varied, as appropriate, from a helicopter with two rotors (one rotor with the exception of a tail rotor) to an octocopter with eight rotors, further covering a multicopter quipped with more rotors, depending on required flight performance and permitted cost among others.

<Multicopter Configuration>

Figure 1:
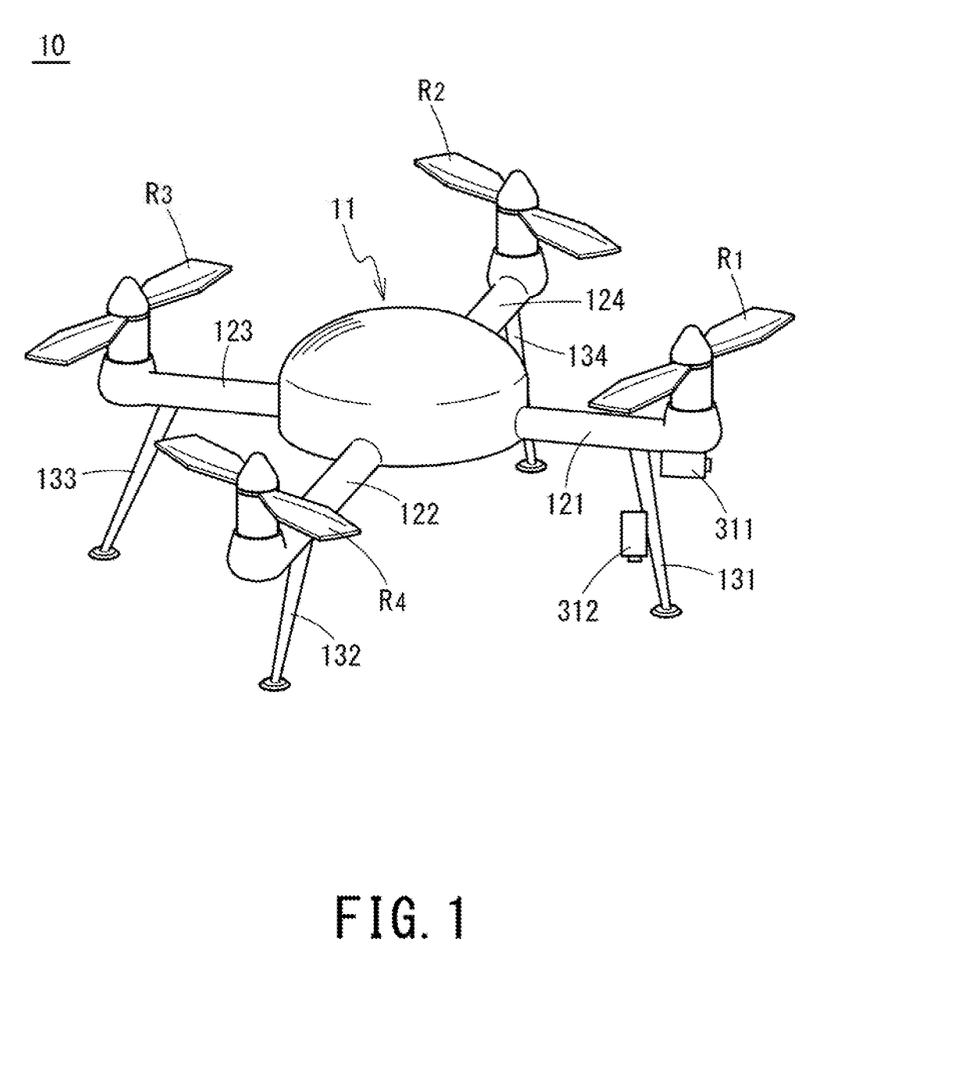
FIG. 1 is an external perspective view of a multicopter pertaining to an embodiment.
Figure 2:
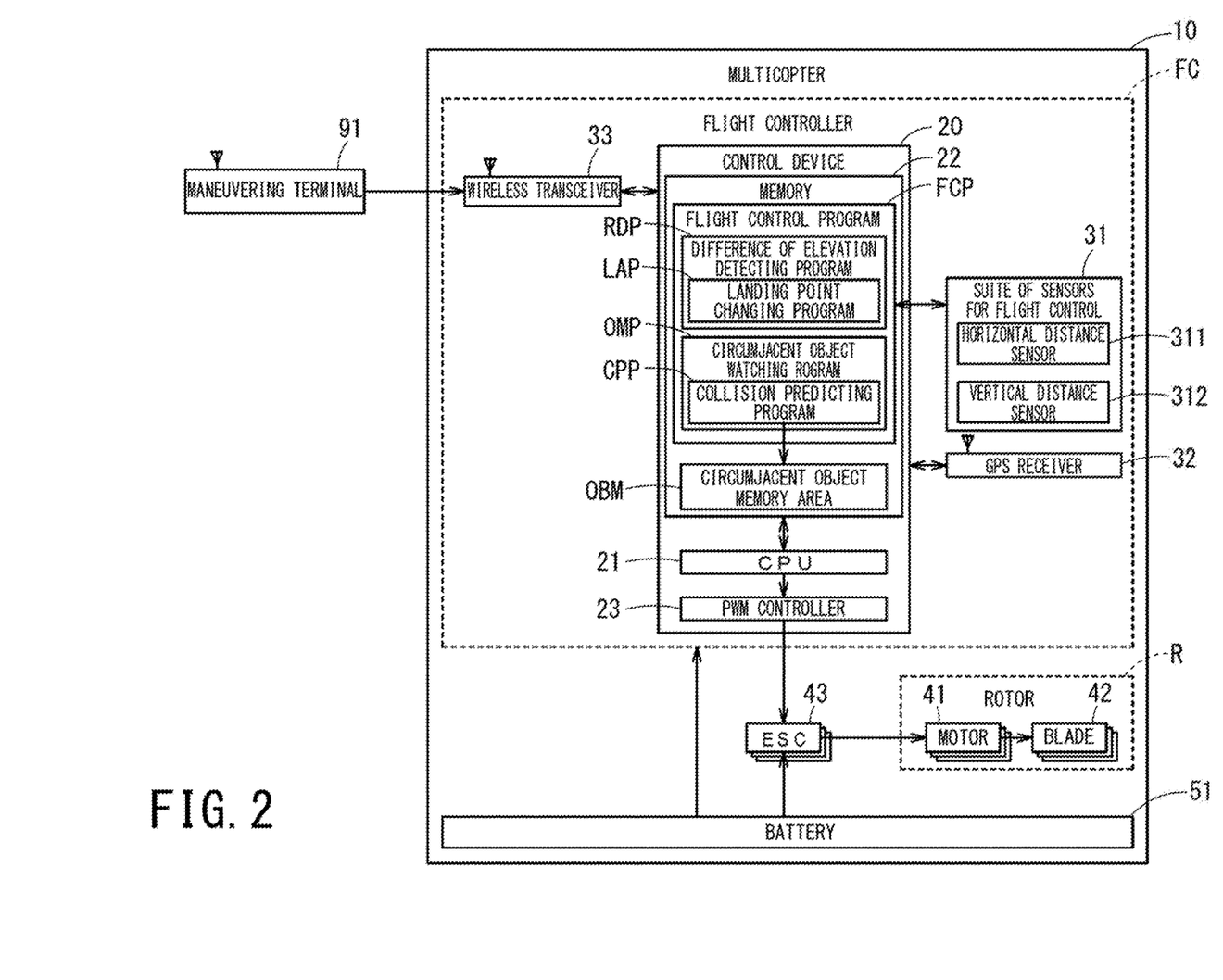
FIG. 2 is a block diagram depicting a functional structure of the multicopter pertaining to an embodiment.

FIG. 1 is a perspective view depicting an external appearance of a multicopter 10 pertaining to an embodiment disclosed herein. FIG. 2 is a block diagram depicting a functional configuration of the multicopter 10.

The following are mounted to the frame 11 of the multicopter 10: a flight controller FC, four rotors R (rotors R1 to R4) and an ESC 43 (Electric Speed Controller) which controls the rotation of these rotors R, a wireless transceiver 33 for wireless communication with an operator's maneuvering terminal 91, and a battery 51 which is a source supplying power.

Each rotor R is comprised of a motor 41 which is a DC motor and a blade 42 installed to its output shaft. The ESC 43 is connected to the motor 41 of the rotor R and is a device which rotates the motor 41 at a speed commanded from the flight controller FC.

The flight controller FC includes a control device 20 which is a microcontroller. The control device 20 includes a CPU 21 which is a central processing unit, a memory 22 which is a storage device such as ROM and RAM, and a PWM controller 23 which controls the rotating speed and rotation rate (which will hereinafter be simply referred to as "rotating speed" as a collective term) of each motor 41 via the ESC 43.

The flight controller FC further includes a suite 31 of sensors for flight control and a GPS receiver 32 (which may hereinafter be referred to as "sensors and other equipment") and they are connected to the control device 20. The suite 31 of sensors for flight control of the multicopter 10 in the present embodiment includes an acceleration sensor, an angular velocity sensor, an atmospheric pressure sensor (altitude sensor), a geomagnetic sensor (direction sensor), etc. Through these sensors and the like, the control device 20 is able to acquire the multicopter's positional information including a latitude, longitude, and flight altitude during a flight and a heading azimuth, in addition to a tilt and turn of the airframe.

In the memory 22 of the control device 20, a flight control program FCP is stored in which a flight control algorithm is programmed to control the attitude of the multicopter 10 during flight and a basic flying operation. According to a command from the operator (the maneuvering terminal 91), the flight control program FCP causes the multicopter 10 to fly, while adjusting the rotating speed of each rotor R and compensating the airframe attitude and positional misalignment based on the current position acquired from the sensors and the like. In addition, by preregistering parameters such as, e.g., latitude, longitude, flight altitude, and a flight route, the program is also able to cause the multicopter to fly autonomously to a destination (such an autonomous flight will hereinafter be referred to as "autopilot"). Now, an example in which the multicopter 10 is caused to fly by autopilot is mainly described in the present embodiment.

<Configuration to Detect a Circumjacent Object>

The multicopter 10 of the present embodiment further includes distance sensors (a horizontal distance sensor 311 and a vertical distance sensor 312) which measure a distance between the airframe and a circumjacent object around it. As depicted in FIG. 1, the horizontal distance sensor 311 is installed on the tip of an arm 121 which is one of four arms 121, 122, 123, 124 (these four arms will hereinafter be referred to as "arms 12" as a collective term) that the frame 11 has and its detection direction is fixed to a horizontal direction from the airframe. That is, as depicted in FIG. 1, although the horizontal distance sensor 311 is installed on the arm 121, a horizontal distance sensor is not provided on all arms (in particular arms 122, 123, 124) of the four arms 121, 122, 123, 124. From the under surfaces of the respective arms 12, skids 131, 132, 133, 134 (legs) extend downward (these four skids will hereinafter be referred to as "skids 13" as a collective term). The vertical distance sensor 312 is installed on a skid 131 extending from an arm 121 and its detection direction is fixed to a vertically downward direction. Installation positions of these distance sensors 311, 312 are not limited to those specified in the present embodiment. The horizontal distance sensor 311 may be installed on a portion other than the arm 12, provided that its detection direction is oriented along a horizontal direction from the airframe. Similarly, the vertical distance sensor 312 may also be installed on a portion other than the skid 13, provided that a distance between any skid 13 and a landing point can be measured. In addition, the attaching positions and the number of the skids 13 are also not limited to those set forth in the present embodiment and can be changed appropriately.

For the horizontal distance sensor 311 and the vertical distance sensor 312 in the present embodiment, for example, distance sensors using laser, infrared rays, or an ultrasonic wave or an image sensor system which determines a distance to a circumjacent object with an image analysis engine provided separately can be used, depending on use application of the multicopter 10 and environment where the multicopter 10 is used. Also, the distance sensors only of a singly type do not always need to be used and a combination of the abovementioned sensors and a combination of the abovementioned sensors with a motion sensor or a metal sensor may be used. In addition, the number of the horizontal distance sensor installed and the vertical distance sensor installed is not limited to one for each and a plurality of horizontal distance sensors and a plural of vertical distance sensors may be provided an alternative configuration. Now, either one of the horizontal and vertical distance sensors may only be installed. For the distance sensors in the present invention, their principle, type, and performance are not limited specifically, provided that they are able to measure a relative distance to a circumjacent object and a direction, position, and detection angle of distance measurement by the distance sensors can be expanded by turning the airframe.

In the memory 22 of the control device 20, a circumjacent object watching program OMP (automatic turning means) is further stored which causes the multicopter 10 to turn automatically in a yaw direction to orient the distance sensor 311 along a plurality of different directions (orientations), according to a command from the operator's maneuvering terminal 91 or an autopilot process. Also, the memory 22 has a circumjacent object memory area OBM (circumjacent object storing means) in which, for a circumjacent object detected by the circumjacent object watching program OMP, the circumjacent object and its detection direction and distance are stored as a circumjacent object to watch out for.

The circumjacent object watching program OMP has, as its sub-program, a collision predicting program CPP (collision predicting means) which calculates a predicted time of collision between a detected circumjacent object and the multicopter 10. The collision predicting program CPP is a program which calculates a predicted time of collision with a circumjacent object from the flying speed of the multicopter 10 and the position of the circumjacent object when the detected circumjacent object is not stored as a circumjacent object to watch out for in the circumjacent object memory area OBM, and calculates a predicted time of collision with a circumjacent object from a relative approach speed between the multicopter 10 and the circumjacent object and the position of the circumjacent object when the detected circumjacent object is stored as a circumjacent object to watch out for in the circumjacent object memory area OBM.

In the memory 22, a difference-of-elevation detecting program RDP (automatic turning means) is further stored which causes the airframe to turn near a landing point during landing of the multicopter 10 and measures a distance to the landing point for all the skids 13. In the memory 22, a landing point changing program LAP (landing point changing means) is further registered which displaces the multicopter 10 in a horizontal direction when the distance from the skids 13 to the landing point, measured by the difference-of-elevation detecting program RDP, is larger than a predetermined value.

<Circumjacent Object Watching Process Through the Horizontal Distance Sensor>

Figure 3:
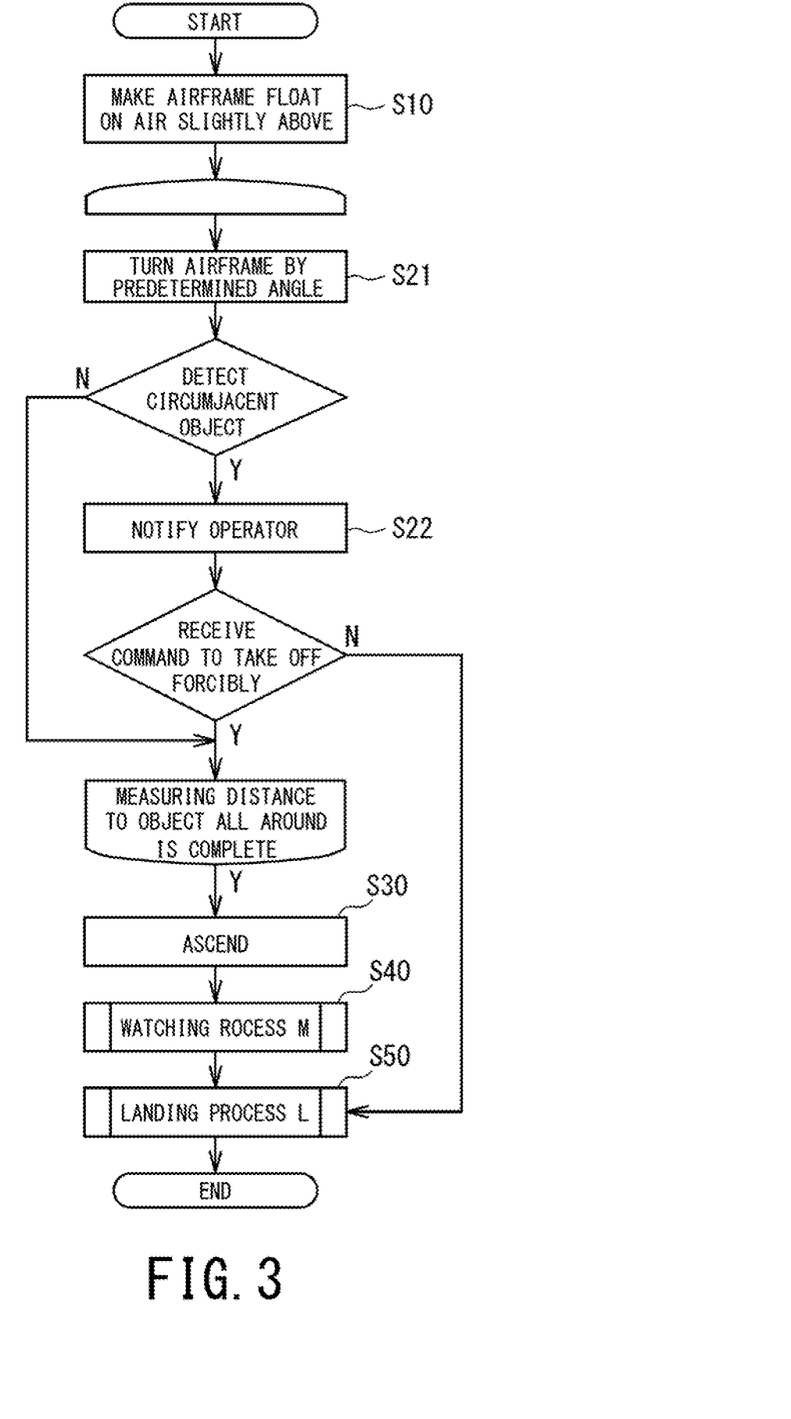
FIG. 3 is a flowchart illustrating a flow from takeoff to landing of the multicopter pertaining to an embodiment.
Figure 4:
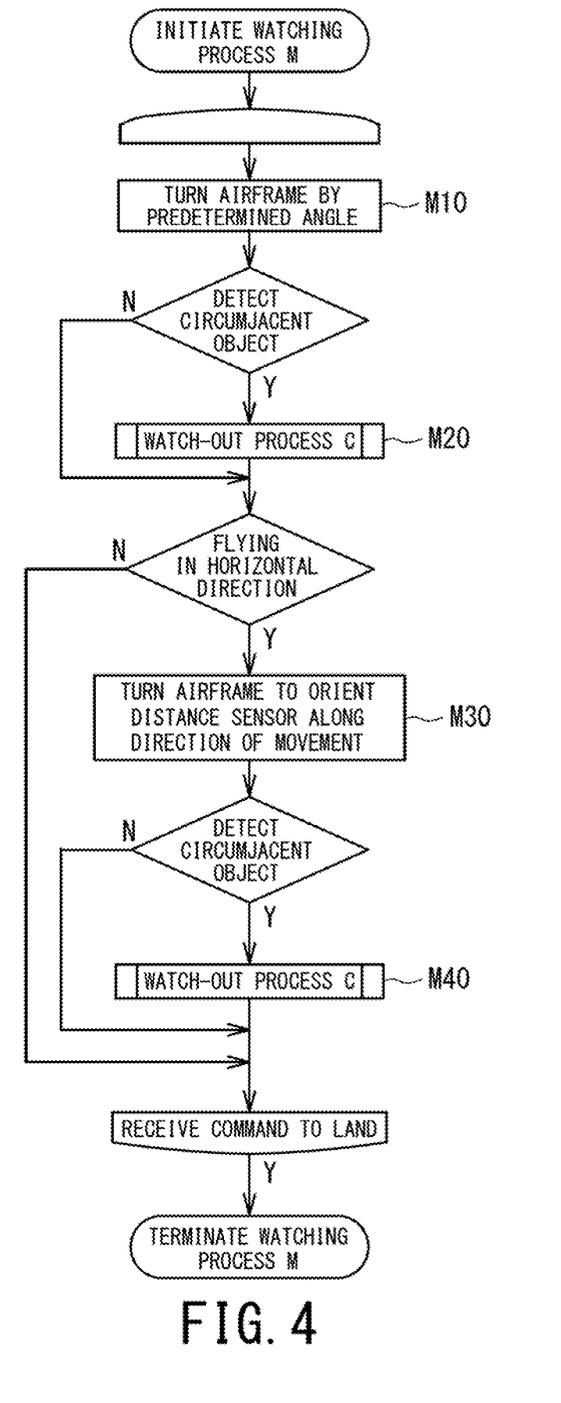
FIG. 4 is a flowchart illustrating a flow of a watching process for a circumjacent object, which is performed by the multicopter pertaining to an embodiment.
Figure 5:
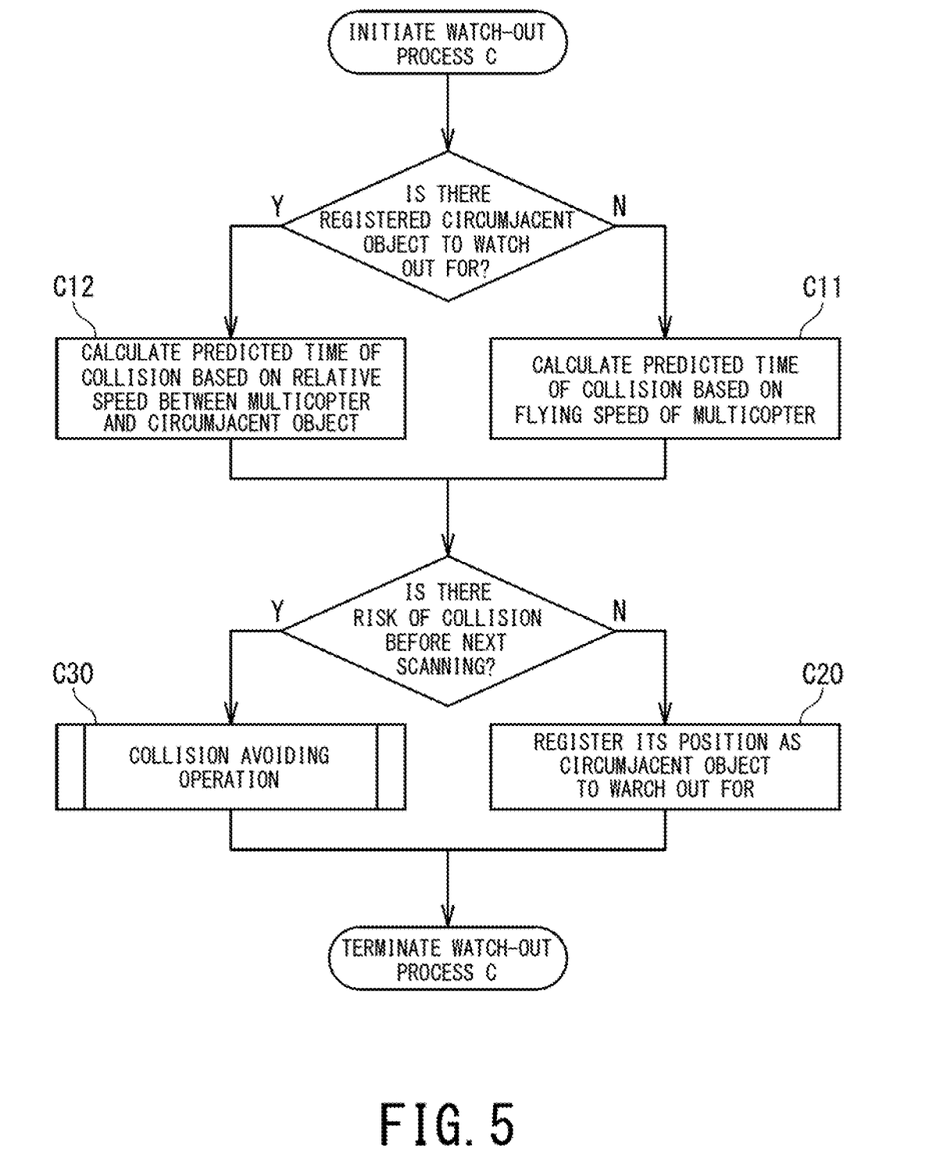
FIG. 5 is a flowchart illustrating a flow of a watch-out process for a circumjacent object, which is performed by the multicopter pertaining to an embodiment.

A circumjacent object watching process using the distance sensor 311 is described below with reference to flowcharts in FIGS. 3 to 5. FIG. 3 illustrates a flow from takeoff of thee multicopter 10 to landing, FIG. 4 illustrates a flow of a circumjacent object watching process M performed by the multicopter 10, and FIG. 5 illustrates a flow of a circumjacent object warning process C performed by the multicopter 10.

[Takeoff Procedure]

As illustrated in FIG. 3, when a command to take off has been received from the operator's maneuvering terminal 91 or the autopilot process, the multicopter 10 makes the airframe float on air slightly above its position without making the airframe ascend to a specified altitude immediately (S10).

Then, by a distance-to-circumjacent object measuring program OMP, while turning the airframe in a yaw direction, the multicopter 10 scans around the periphery of the airframe with the horizontal distance sensor 311 to check for the presence of a circumjacent object that is located close to the airframe (S21). Here, the multicopter 10 of the present embodiment detects a circumjacent object around the periphery of the airframe by turning the airframe in steps according to an angle range of sensing enabled the horizontal distance sensor 311 in a circumferential direction of the air frame (such angle range will hereinafter be referred to as a "detection angle"). For example, if the detection angle of the horizontal distance sensor 311 is 30° to the right and to the left distance measurement is performed, while turning the airframe in steps by 60° and six times. Now, a way of turning the airframe is not limited to the way set forth in the present embodiment. If the speed of measuring a distance by the distance sensor is sufficiently rapid and if such a sensor, like a motion sensor, based on the premise that its detection direction is fixed is not used, distance measurement may be performed, while turning the airframe continuously without stopping the turn of the airframe at every predetermined angle. In addition, for instance, by providing respective horizontal distance sensors 311 in symmetric positions in a circumferential direction of the airframe, it is possible to decrease an angle of turn and the number of turns required to scan around the periphery of the airframe.

Whenever detecting the presence of a circumjacent object close to the multicopter 10, the distance-to-circumjacent object measuring program OMP notifies the operator (the maneuvering terminal 91) of the presence and waits for a command as to whether to continue the takeoff from the operator. If there is no circumjacent object close to the multicopter 10 or if a command to take off forcibly (continue the takeoff process) has been received from the operator for all detected circumjacent objects, the airframe is made to ascend to a specified altitude (S30). On the other hand, if a command to take off forcibly has not been received for any circumjacent object, the multicopter 10 aborts the takeoff and lands the airframe (S50).

Now, the foregoing takeoff procedure is purely additional measures for ensuring safety when the multicopter 10 takes off and it is not intended that such procedure must be followed whenever the multicopter 10 takes off. In a case where safety can be ascertained beforehand at a takeoff point, for instance, when the multicopter takes off by visual maneuvering of the operator, the multicopter 10 may be made to ascend immediately by a command to take off from the operator's maneuvering terminal 91 or the autopilot process.

[Watching Process]

Upon completion of ascending (S30), the multicopter 10 of the present embodiment automatically initiates a watching process M (S40). Now, the watching process M does not always need to be initiated following ascending (S30), and the multicopter may initiate the watching process M may be initiated in wait for a command to initiate it from the operator's maneuvering terminal 91 or the autopilot process. Or the watching process may be executed at a predetermined period after ascending of the airframe or at odd intervals based on other conditions.

As illustrated in FIG. 4, when the watching process M is initiated, the multicopter 10 watches for circumjacent object, while making the airframe turn, by the distance-to-circumjacent object measuring program OMP. Here, the distance-to-circumjacent object measuring program OMP takes different ways of watching depending on whether the multicopter 10 is hovering or flying in a horizontal direction.

More specifically, when the multicopter 10 is hovering, the distance-to-circumjacent object measuring program OMP makes the airframe turn in steps according to the detection angle of the horizontal distance sensor 311 (M10) and watches for a circumjacent object around the periphery of the airframe (a procedure for watching for an approaching object). In this way, using a commonly used distance sensor with its detection direction fixed relatively with respect to the orientation of the airframe as well as by turning the airframe itself around entirely in its yaw direction, it is enabled to find a circumjacent object as an object to watch out for all around the airframe, while suppressing an increase in airframe cost. Now, as described previously, a way of turning the airframe is not limited to the way set forth in the present embodiment and distance measurement may be performed, while turning the airframe continuously, if distance measurement can be performed without stopping the turn of the airframe at each predetermined angle.

On the other hand, when the multicopter 10 is flying in a horizontal direction, the distance-to-circumjacent object measuring program OMP turns the airframe so as to orient the horizontal distance sensor 311 mainly along a direction of movement (M30) and, additionally, orient the horizontal distance sensor 311 toward a direction differing from the direction of movement of the airframe at a predetermined period (e.g., at intervals of several seconds) and by a predetermined angle (e.g., 60° to the right and 60° to the left, alternately, with respect to the direction of movement) (M10) (a procedure for watching for an obstacle). In this way, by making an arrangement such that, when the airframe is flying horizontally, distance-to-object measurement with a central focus on the direction of its movement is also performed in other directions periodically, it is enabled to watch mainly along the direction of movement with the highest risk of collision with a circumjacent object and, at the same time, also watch out for an approaching object from other directions.

When the horizontal distance sensor 311 has detected a circumjacent object, the distance-to-circumjacent object measuring program OMP executes a watch-out process C (M20, M40).

[Watch-Out Process]

As illustrated in FIG. 5, when the horizontal distance sensor 311 detects a circumjacent object, the collision predicting program CPP which is a sub-program of the distance-to-circumjacent object measuring program OMP first searches the circumjacent object memory area OBM to see whether there is a registered circumjacent object to watch out for in the vicinity (e.g., within a range of 5 m) of the detection position of the circumjacent object. Now, when the multicopter 10 is flying horizontally, when matching the detected circumjacent object with a circumjacent object to watch out for, a relative position of the circumjacent object to watch out for from the airframe at the current point of time is calculated based on the flying direction and speed of the multicopter 10 after the circumjacent object to watch out for was detected in the previous scanning operation, and matching with the circumjacent object detected now is checked for with respect to that position.

Then, if there is no registered circumjacent object to watch out for that is matching, the collision predicting program CPP calculates a predicted time of collision with the circumjacent object from the flying speed of the multicopter 10 and the position of the circumjacent object (C11). At this time, it is assumed that the detected circumjacent object stands still. Otherwise, if there is a registered circumjacent object to watch out for that matches, the program calculates a relative approach speed between the multicopter 10 and the circumjacent object to watch out for from the position of the circumjacent object to watch out for, measured in the previous scanning operation, and its current position and a scanning interval for the same circumjacent object to watch out for, and calculates a predicted time of collision with the circumjacent object to watch out for from this relative approach speed and the position of the object detected now (C12).

Now, given that the distance between the airframe of the multicopter 10 and the detected circumjacent object is denoted by Lnow [m], the flying speed of the multicopter 10 is denoted by Vabs [m/s], and the scanning interval in the same direction by the horizontal distance sensor 311 is denoted by Tsi [sec], the possibility of collision in the above step C11 is judged by the following mathematical expression.

$$L_{now}\,[\text{m}] < V_{abs}\,[\text{m/sec}] \times T_{si}\,[\text{sec}] \qquad [\text{Mathematical Expression 1}]$$

Similarly, given that the distance between the airframe of the multicopter 10 and the circumjacent object is denoted by Lnow [m], the relative approach speed between the multicopter 10 and the circumjacent object is denoted by Vrel [m/sec], and the scanning interval in the same direction by the horizontal distance sensor 311 is denoted by Tsi [sec], the possibility of collision in the above step C12 is judged by the following mathematical expression.

$$L_{now}\,[\text{m}] < V_{rel}\,[\text{m/sec}] \times T_{si}\,[\text{sec}] \qquad [\text{Mathematical Expression 2}]$$

If a calculation result of the above expressions is true, the possibility of collision is judged high and a collision avoiding operation of the multicopter 10 is executed by the distance-to-circumjacent object measuring program OMP or other programs which are not mentioned in the drawings (C30). As the collision avoiding operation, for example, the following are conceivable: stopping the horizontal flight of the multicopter 10, changing the altitude, or moving in a direction far from the circumjacent object, and notifying the operator in conjunction with any of the abovementioned ones. Otherwise, if a calculation result of the above expressions is false, the possibility of collision is judged low and the detected circumjacent object and its detection direction and distance are registered as a circumjacent object to watch out for into the circumjacent object memory area OBM.

Now, the scanning interval Tsi which is an operand in the above expressions is not limited to this and, for example, fixed seconds may be specified. In addition, for instance, when the multicopter 10 is moving at high speed, a value obtained by calculating the right-hand side may be multiplied by, e.g., 2 and then a result may be compared with the distance Lnow (m); thus, safety during a high-speed flight can be enhanced. Now, in the present embodiment, even when a circumjacent object has been detected, if the possibility of collision with it is low at that point in time, information on the circumjacent object is registered into the circumjacent object memory area OBM and the turn of the airframe continues. However, for instance, when a circumjacent object has been detected during hovering, an arrangement may be made such that distance-to-object measurement in that direction is performed for a given period of time and, after judging whether the possibility of collision with the circumjacent object is high or low, a decision is made of whether to leave the circumjacent object as is or execute a collision avoiding operation.

The distance-to-circumjacent object measuring program OMP in the present embodiment repeats this watching process M until a command to land is received from the operator's maneuvering terminal 91 or the autopilot process.

<Roughness Detecting Process Through the Vertical Distance Sensor>

Figure 6:
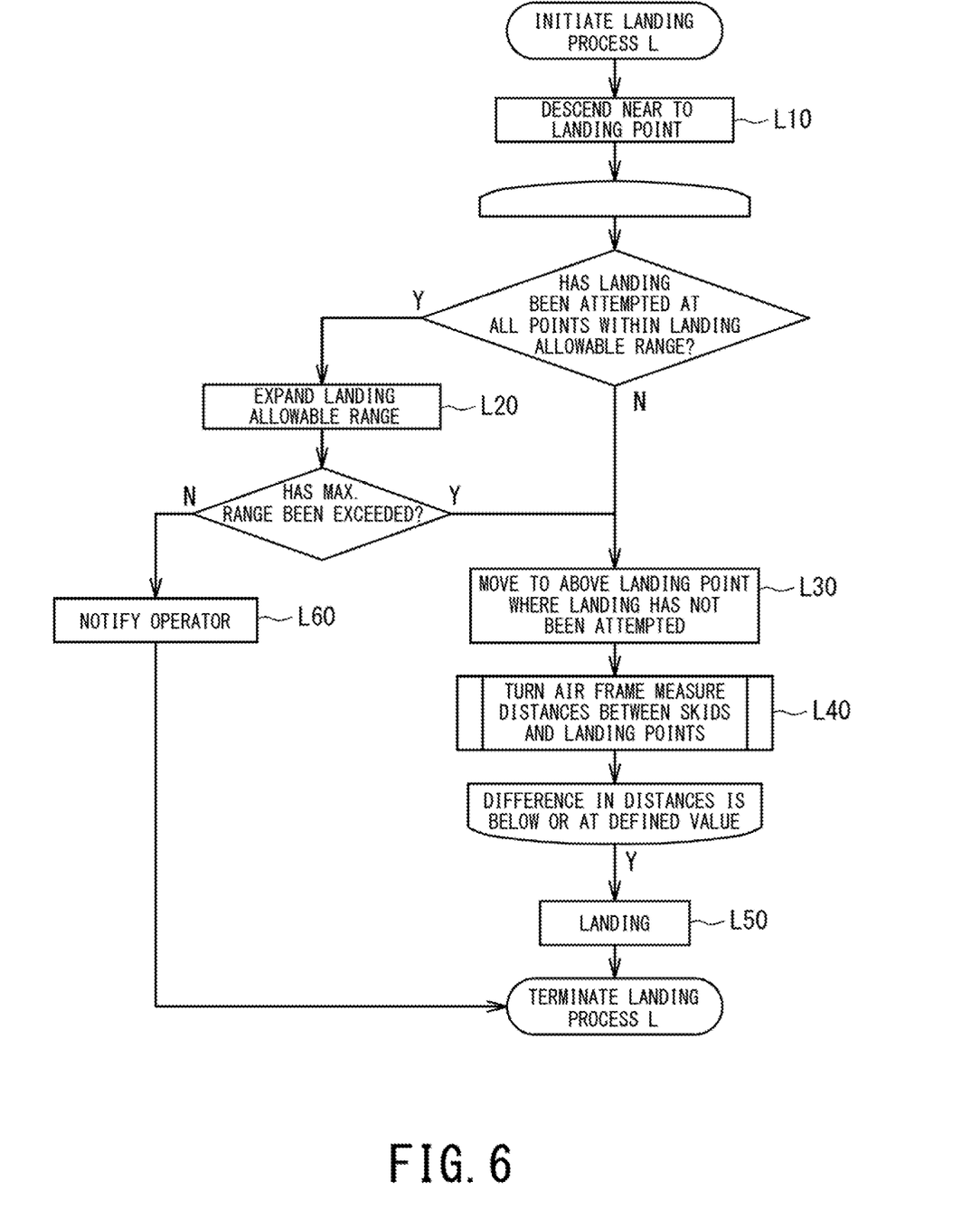
FIG. 6 is a flowchart illustrating a flow of a landing process which is performed by the multicopter pertaining to an embodiment.

FIG. 6 is a flowchart illustrating a flow of a landing process L performed by the multicopter 10. When the flying multicopter 10 receives a command to land from the operator's maneuvering terminal 91 or the autopilot process, the landing process L illustrated in FIG. 6 is initiated. When the landing process L is initiated, the multicopter 10 descends near to a landing point (L10).

Then by the difference-of-elevation detecting program RDP, the multicopter 10 turns the airframe near the landing point and measures distances to landing points for all skids 13 through the vertical distance sensor 312 (L40) (a procedure for detecting a difference of elevation). Then, when a difference (difference of elevation) in the distances to these landing points is below or at a defined value (e.g., 10 cm) that has been preset depending on the size and shape of the airframe or the placement positions of the skids, the airframe is made to land in that position (L50). In this way, by measuring the distances of the respective skids 13 to their landing points by turning the airframe of the multicopter 10, it is enabled to detect roughness of ground at the airframe landing point beforehand and prevent the airframe from falling down when landing.

With FIG. 6 and FIGS. 7 to 9, the landing process L is described below more specifically. When the multicopter 10 receives a command to land from the operator's maneuvering terminal 91 or the autopilot process, the flight control program FCP controls the rotating speed of the rotors R while monitoring an output value of the vertical distance sensor 312, and makes the airframe descend at a predetermined or command speed.

Figure 7:
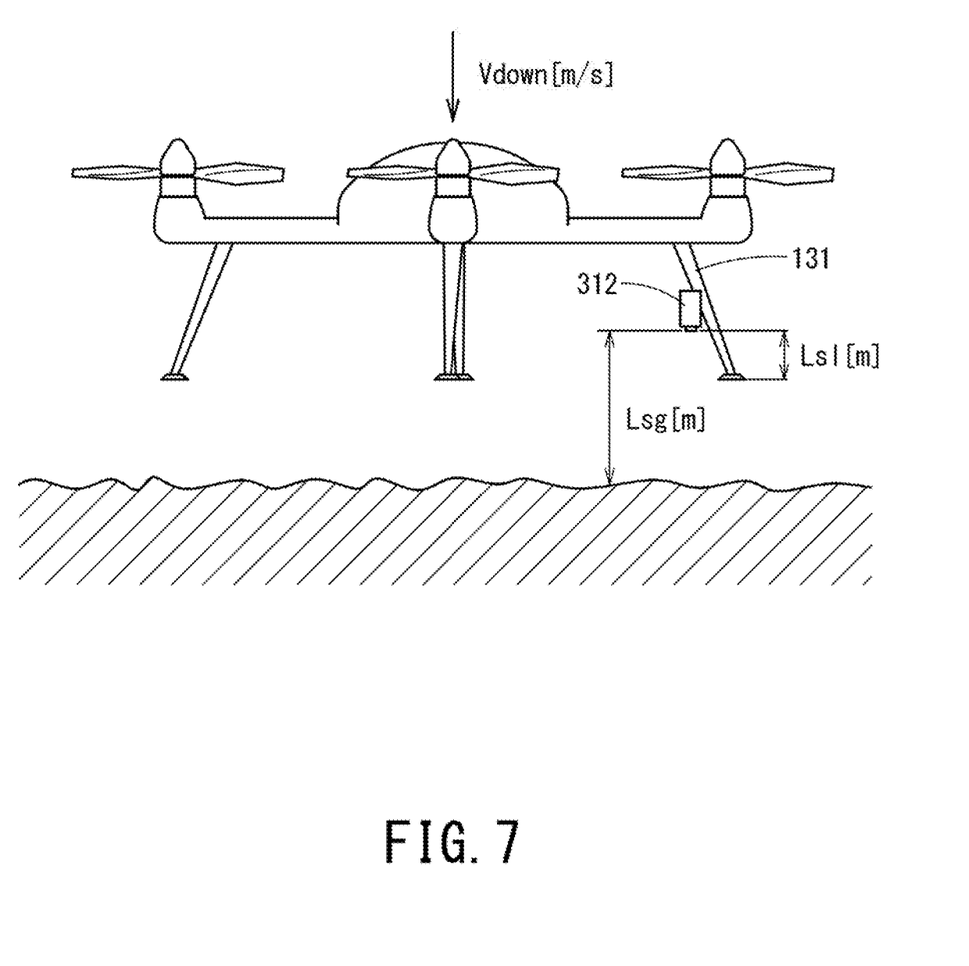
FIG. 7 is a side view to explain one example of how the multicopter pertaining to an embodiment descends when landing.

As depicted in FIG. 7, when the distance from the vertical distance sensor 312 to the lower end of each skid 131 is denoted by Lsl [m], the descending speed is denoted by Vdown [m/sec], the distance from the vertical distance sensor 312 to the landing point of each skid 131 is denoted by Lsg [m], and the measurement interval is denoted by Tsi [sec]; than the distance of descending during a measurement is Vdown×Tsi [m]. A measurement interval and descending speed must be set to ensure that Lsg [m]>Vdown [m/sec]× Tsi [sec]. A state in which the airframe comes sufficiently close to the landing point and the lower ends of the skids 13 do not touch the landing point can be expressed as a condition that Lsg>Lsl and, e.g., Lsg>approx. 1 to 2 [m].

In the present embodiment, the airframe is made to descend until the airframe approaching the landing point comes at a height above ground of approx. several tens of cm to 1 m and the difference of elevation of the landing point in that position is checked by the difference-of-elevation detecting program RDP.

Figure 8:
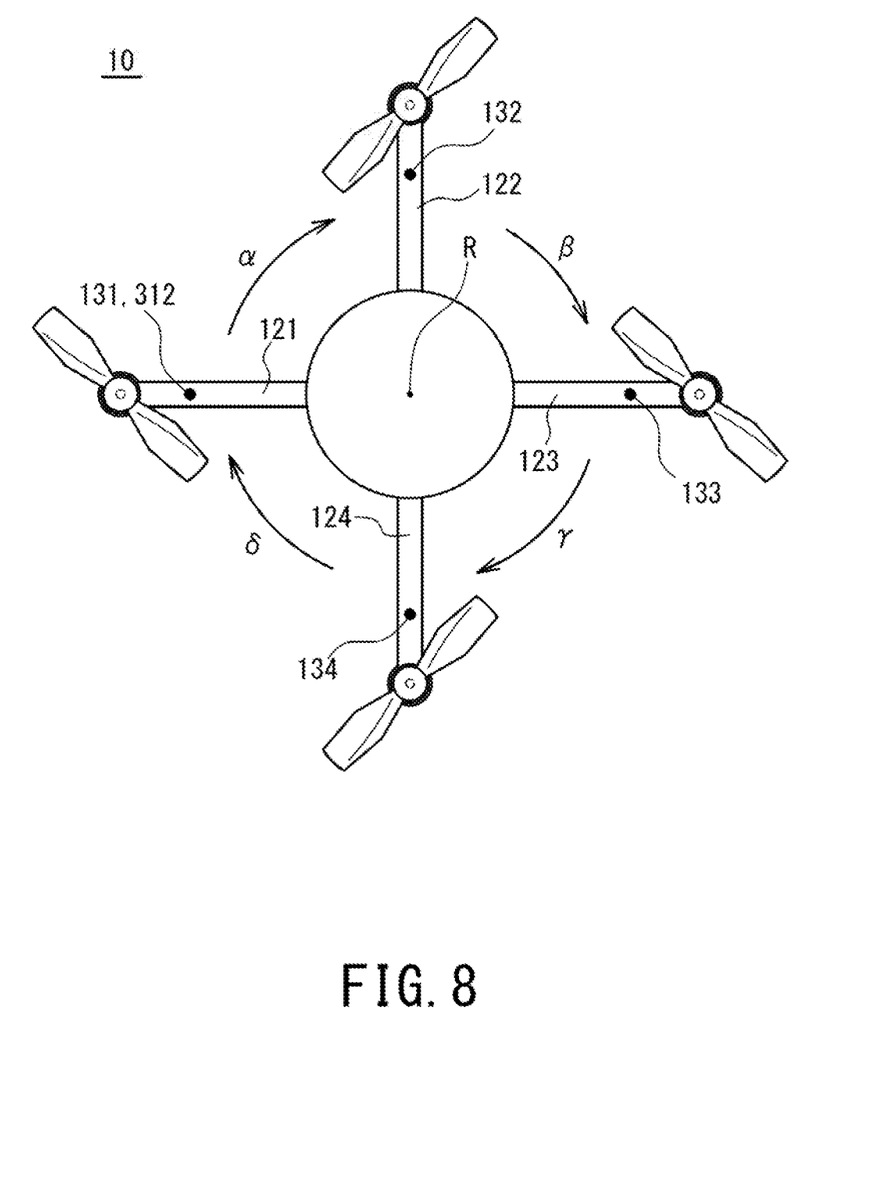
FIG. 8 is a plan view to explain a difference of elevation detecting operation of the multicopter pertaining to an embodiment.

FIG. 8 is a plan view of the multicopter 10. Four arms radially extend from the main body of the circumferential direction of the frame 11. Also, from the under surfaces of the respective arms 12, the skids 13 extend downward. In a case where the vertical distance sensor 312 is installed on the skid 131, the difference-of-elevation detecting program RDP first measures a distance from the skid 131 to its landing point through the vertical distance sensor 312. Then, by turning the multicopter 10 by 90° clockwise, as depicted in FIG. 8, the skid 131 and the vertical distance sensor 312 are moved in an α direction and, in that position, a distance from the skid 131 to the landing point is measured through the vertical distance sensor 312. Likewise, the skid 131 and the vertical distance sensor 312 are made to move in a β direction and in γ direction in turn, a distance from the skid 131 to the landing point is measured through the vertical distance sensor 312. Finally, the skid 131 and the vertical distance sensor 312 are made to move in a δ direction to return the multicopter 10 to its initial orientation.

Figure 9:
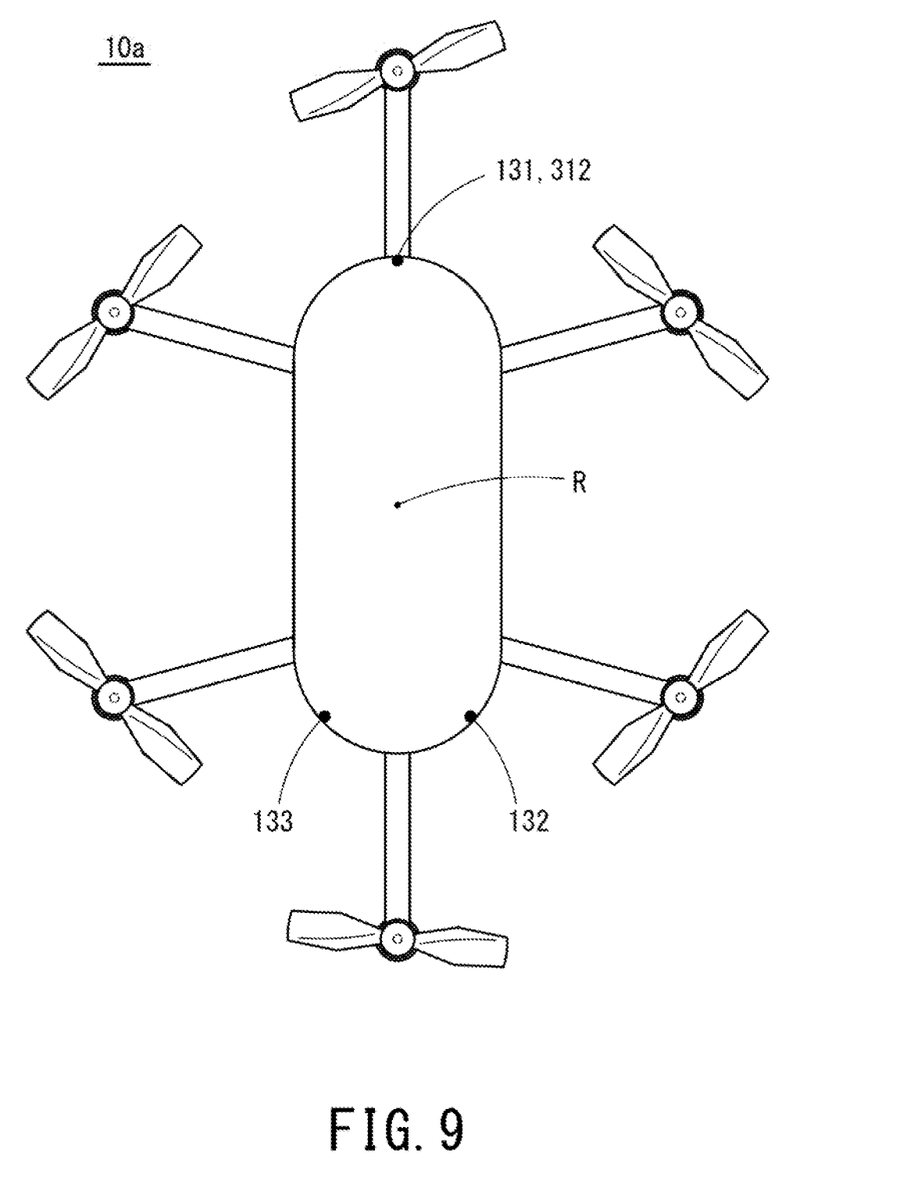
FIG. 9 is a plan view illustrating a modification of the difference of elevation detecting operation of the multicopter pertaining to an embodiment.

FIG. 9 is a plan view of a multicopter 10a which is a modification of the multicopter 10. The multicopter 10a has three skids 131, 132, 133 and the vertical distance sensor 312 is installed on the skid 131. The difference-of-elevation detecting program RDP first measures a distance between the skid and its landing point through the vertical distance sensor 312. Then, the multicopter 10a is made to turn by 150° in either yaw direction and, in that position, a distance from the skid to the landing point is measured through the vertical distance sensor 312. Next, the multicopter 10a is made to turn by 60° in the same direction as earlier and, in that position a distance from the skid to the landing point is measured through the vertical distance sensor 312. Finally, the multicopter 10a is made to turn by 150 again to return the multicopter 10a to its initial orientation.

Now, if the distances from the rotational center R of the airframe of the multicopter 10 to the respective skids 13 are not constant, it is needed to further move the airframe in a horizontal direction after turning the airframe. Hence, to make effective use of the procedure for detecting a difference of elevation, it is preferable to make the distances from the rotational center R of the airframe to the respective skids 13 constant.

When a difference of elevation of the landing points of the respective skids 13 acquired by the difference-of-elevation detecting program RDP is below or at a defined value, the multicopter 10 is made to land in that position (L50). Otherwise, if a difference of elevation of the landing points of the respective skids 13 is more than the defined value, the landing point changing program which is a sub-program of the difference-of-elevation detecting program OMP displaces the landing point of the multicopter 10 to another place within a landing allowable range (e.g., within 1 m from the original landing point) which has been preset depending on the purpose of landing and environment around the landing point among others (L30). Now, in the present embodiment, at this time, the airframe is made to move horizontally in a direction of any skid 13 viewed from the center of the airframe. For instance, if a large difference of elevation is detected for only one of the skids 13 against the other skids 13, the airframe is made to move horizontally in a direction of a skid 13 located on opposite side of the skid 13.

In this way, landing is attempted in all landing positions within the landing allowable range. Nevertheless, if a suitable landing point is not found, the landing point changing program LAP automatically expands the landing allowable range (L20). Then, the program moves the multicopter 10 to a place where landing is not yet attempted within the expanded landing allowable range. In this way, for the multicopter 10 of the present embodiment, in a case where a difference of elevation more than the defined value has been detected for a landing point of any skid 13, it is possible to land the airframe, selecting a place having a smaller difference of elevation, by displacing the airframe landing position in a horizontal direction. This enables it to securely prevent the multicopter 10 from falling down when landing.

An upper limit of an expandable landing allowable range can be preset. If expansion of the landing allowable range has exceeded the upper limit, the landing point changing program LAP notifies the operator of it (L60) and the multicopter waits for a command while hovering on site. Here, if the remaining amount of the battery 51 has become small during waiting, it may be arranged to make the multicopter land forcedly in a place having the smallest difference of elevation among landing points measured until then. In addition, when power of the battery 51 is enough to allow the multicopter to go back to a takeoff point, it may also be arranged to make the multicopter go back to the takeoff point.

While an embodiment of the present invention has been described hereinbefore, the present invention is not limited to the foregoing embodiment and can be modified in various ways without departing from the gist of the invention.

The invention claimed is:

1. An unmanned rotorcraft comprising:
   an airframe;
   a plurality of arms that radially extend from the airframe;
   a plurality of skids that extend downward, wherein each skid of the plurality of skids is attached to the airframe via a respective arm of the plurality of arms;
   at least one distance sensor to measure a distance between the airframe and a circumjacent object around the airframe, wherein the at least one distance sensor and a detection direction of the at least one distance sensor are fixed to the airframe via an arm of the plurality of arms; and a controller that is configured to turn the airframe automatically in a yaw direction under predefined conditions to orient the at least one distance sensor toward a plurality of different orientations or positions, wherein some arms of the plurality of arms are not provided with a distance sensor of the at least one distance sensor.

2. The unmanned rotorcraft according to claim 1, wherein the controller turns the airframe in predetermined angle steps according to a detection angle of the at least one distance sensor.

3. The unmanned rotorcraft according to claim 1, wherein the controller turns the airframe continuously.

4. The unmanned rotorcraft according to claim 1, wherein, when the airframe is flying horizontally, the controller turns the airframe so as to orient the at least one distance sensor along a direction of movement of the airframe and, additionally, orient the at least one distance sensor toward a direction differing from the direction of movement of the airframe at a predetermined period and by a predetermined angle.

5. The unmanned rotorcraft according to claim 1, wherein the controller:

when the at least one distance sensor has detected a circumjacent object, stores in a memory a position of the circumjacent object as a circumjacent object to watch out for;

calculates a predicted time of collision with the circumjacent object based on a flying speed of the airframe and the position of the circumjacent object when the detected circumjacent object is not stored as the circumjacent object to watch out for, and calculates a predicted time of collision with the circumjacent object based on a relative approach speed between the airframe and the circumjacent object and the position of the circumjacent object when the detected circumjacent object is stored as the circumjacent object to watch out for.

6. The unmanned rotorcraft according to claim 1, further comprising:

a plurality of legs to support the airframe when the airframe lands, wherein:

the at least one distance sensor is installed in a position and orientation in order to measure a distance between at least one of the legs and a landing point, and the controller turns the airframe near the landing point and measures a distance to the landing point for all the legs.

7. The unmanned rotorcraft according to claim 6, wherein the controller displaces the airframe in a horizontal direction when a difference in distances from the respective legs to the landing point measured by the controller is more than a predetermined value.

8. A method for measuring a distance to a circumjacent object around an unmanned rotorcraft, wherein the unmanned rotorcraft includes an airframe, a plurality of arms that radially extend from the airframe, a plurality of skids that extend downward, wherein each skid of the plurality of skids is attached to the airframe via a respective arm of the plurality of arms, at least one distance sensor to measure a distance between an airframe and a circumjacent object around the airframe, and the at least one distance sensor and a detection direction of the at least one distance sensor are fixed to the airframe via an arm of the plurality of arms, the method comprising:

watching for an approaching object to detect a circumjacent object all around the airframe by automatically turning the airframe around entirely in a yaw direction under predefined conditions, wherein some arms of the plurality of arms are not provided with a distance sensor of the at least one distance sensor.

9. A method for measuring a distance to a circumjacent object around an unmanned rotorcraft, wherein the unmanned rotorcraft includes an airframe, a plurality of arms that radially extend from the airframe, a plurality of skids that extend downward, wherein each skid of the plurality of skids is attached to the airframe via a respective arm of the plurality of arms, at least one distance sensor to measure a distance between an airframe and a circumjacent object around the airframe, and the at least one distance sensor and a detection direction are fixed to the airframe, the method comprising:

watching for an obstacle to turn the airframe so as to orient the at least one distance sensor along a direction of movement of the airframe and, additionally, orient the at least one distance sensor toward a direction differing from the direction of movement of the airframe at a predetermined period and by a predetermined angle when the airframe is flying horizontally, wherein some arms of the plurality of arms are not provided with a distance sensor of the at east one distance sensor.

10. A method for measuring a distance to a circumjacent object around an unmanned rotorcraft, wherein the unmanned rotorcraft includes: an airframe, a plurality of arms that radially extend from the airframe, at least one distance sensor to measure a distance between an airframe and a circumjacent object around the airframe; and a plurality of legs to support the airframe when the airframe lands, and the at least one distance sensor is installed in a position and orientation in a portion of the plurality of legs, making it possible to measure a distance between at least one of the legs and a landing point, the method comprising:

detecting a difference of elevation to measure a distance to the landing point for all the legs by turning the airframe near the landing point, wherein some legs of the plurality of legs are not provided with a distance sensor of the at least one distance sensor.

* * * * *